US009003077B2

(12) United States Patent
Ye et al.

(10) Patent No.: US 9,003,077 B2
(45) Date of Patent: Apr. 7, 2015

(54) SHARING IOMMU MAPPINGS ACROSS DEVICES IN A DMA GROUP

(75) Inventors: Cheng Sean Ye, Beijing (CN); Wesley Shao, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 133 days.

(21) Appl. No.: 13/249,495

(22) Filed: Sep. 30, 2011

(65) Prior Publication Data

US 2013/0086285 A1    Apr. 4, 2013

(51) Int. Cl.
*G06F 13/28* (2006.01)

(52) U.S. Cl.
CPC ........................................ *G06F 13/28* (2013.01)

(58) Field of Classification Search
None
See application file for complete search history.

(56) References Cited

U.S. PATENT DOCUMENTS

| 6,510,164 B1* | 1/2003 | Ramaswamy et al. ........ 370/466 |
| 2004/0042478 A1* | 3/2004 | Bertagna ........................ 370/432 |
| 2009/0287861 A1* | 11/2009 | Lipps et al. ...................... 710/28 |
| 2010/0217905 A1* | 8/2010 | Arimilli et al. ................ 710/263 |
| 2012/0017029 A1* | 1/2012 | Santos et al. ...................... 711/6 |

OTHER PUBLICATIONS

"AMD I/O Virtualization Technology (IOMMU) Specification", IOMMU Architectural Specification, PID 34434 Rev 1.26—Feb. 2009 (90 pages).

* cited by examiner

*Primary Examiner* — Ilwoo Park
(74) *Attorney, Agent, or Firm* — Osha Liang LLP

(57) ABSTRACT

A method that includes creating a DMA group, adding a first I/O device to the DMA group, and adding a second I/O device to the DMA group. The method further includes instructing an I/O MMU to create a shared virtual DMA address, mapping a memory location to the shared virtual DMA address in the DMA group translation table, and providing the shared virtual DMA address to the device drivers. The method further includes determining that the first I/O device has received DMA group data, instructing a first DMA controller to transfer the DMA group data from the first I/O device to the shared virtual DMA address, determining that the shared virtual DMA address has received the DMA group data, and instructing a second DMA controller to transfer the DMA group data from the memory location corresponding to the shared virtual DMA address to the second I/O device.

14 Claims, 9 Drawing Sheets

SHARING IOMMU MAPPINGS ACROSS DEVICES IN A DMA GROUP

BACKGROUND

Some modern computer systems use memory management units (MMUs) to control access to memory resources on the computer system. A system's MMU may create a mapping between virtual memory addresses used by different software elements on the computer system and the physical memory address used by hardware elements on the system. Minimizing the amount of resources used by the MMU may result in an increase in the overall system efficiency.

SUMMARY

In general, in one aspect, the invention relates to a non-transitory computer readable medium comprising instructions, which when executed by a processor perform a method. The method includes creating a direct memory access (DMA) group, adding a first input/output (I/O) device to the DMA group, wherein the first I/O device is associated with a first device driver executing on a host, and adding a second I/O device to the DMA group, wherein the second I/O device is associated with a second device driver executing on the host. The method further includes instructing an I/O memory management unit (MMU) to create a DMA group translation table comprising a shared virtual DMA address, mapping a memory location within a physical memory to the shared virtual DMA address in the DMA group translation table, and providing the shared virtual DMA address to the first device driver and the second device driver. The method further includes determining that the first I/O device has received DMA group data, instructing, by the first device driver, a first DMA controller to transfer the DMA group data from the first I/O device to the memory location corresponding to the shared virtual DMA address, determining that the memory location corresponding to the shared virtual DMA address has received the DMA group data, and instructing, by the second device driver, a second DMA controller to transfer the DMA group data from the memory location corresponding to the shared virtual DMA address to the second I/O device.

In general, in one aspect, the invention relates to a system including a first input/output (I/O) device, a second I/O device, a physical memory comprising a memory location, an I/O memory management unit (MMU) comprising a direct memory access (DMA) group translation table; a host operating system (OS), a first I/O device driver, and a second I/O device driver. The physical memory includes a memory location. The I/O MMU includes a direct memory access (DMA) group translation table. The host OS is configured to create a DMA group; add the first I/O device and the second I/O device to the DMA group, instruct the I/O MMU to create a shared virtual DMA address in the DMA group translation table, map the memory location to the shared virtual DMA address in the DMA group translation table, and provide the shared virtual DMA address to the first device driver and the second device driver. The first I/O device driver is configured to determine that the first I/O device has received DMA group data, and instruct a first DMA controller to transfer the DMA group data from the first I/O device to the memory location corresponding to the shared virtual DMA address. The second I/O device driver is configured to determine that the memory location corresponding to the shared virtual DMA address has received the DMA group data, and instruct a second DMA controller to transfer the DMA group data from the memory location corresponding to the shared virtual DMA address to the second I/O device.

In general, in one aspect, the invention relates to a method for sharing an input/output (I/O) memory management unit translation table. The method includes creating a direct memory access (DMA) group, adding a first input/output (I/O) device port to the DMA group, wherein the first I/O device port is associated with a first I/O device and a first device driver executing on a host, and adding a second I/O device port to the DMA group, wherein the second I/O device port is associated with a second I/O device and a second device driver executing on the host. The method further includes instructing an I/O memory management unit (MMU) to create a DMA group translation table comprising a shared virtual DMA address, mapping a memory location within a physical memory to the shared virtual DMA address in the DMA group translation table, and providing the shared virtual DMA address to the first device driver and the second device driver. The method further includes determining that the first I/O device port has received DMA group data, instructing, by the first device driver, a first DMA controller to transfer the DMA group data from the first I/O device port to the memory location corresponding to the shared virtual DMA address, determining that the memory location corresponding to the shared virtual DMA address has received the DMA group data, and instructing, by the second device driver, a second DMA controller to transfer the DMA group data from the memory location corresponding to the shared virtual DMA address to the second I/O device port.

DETAILED DESCRIPTION

Figure 1A:
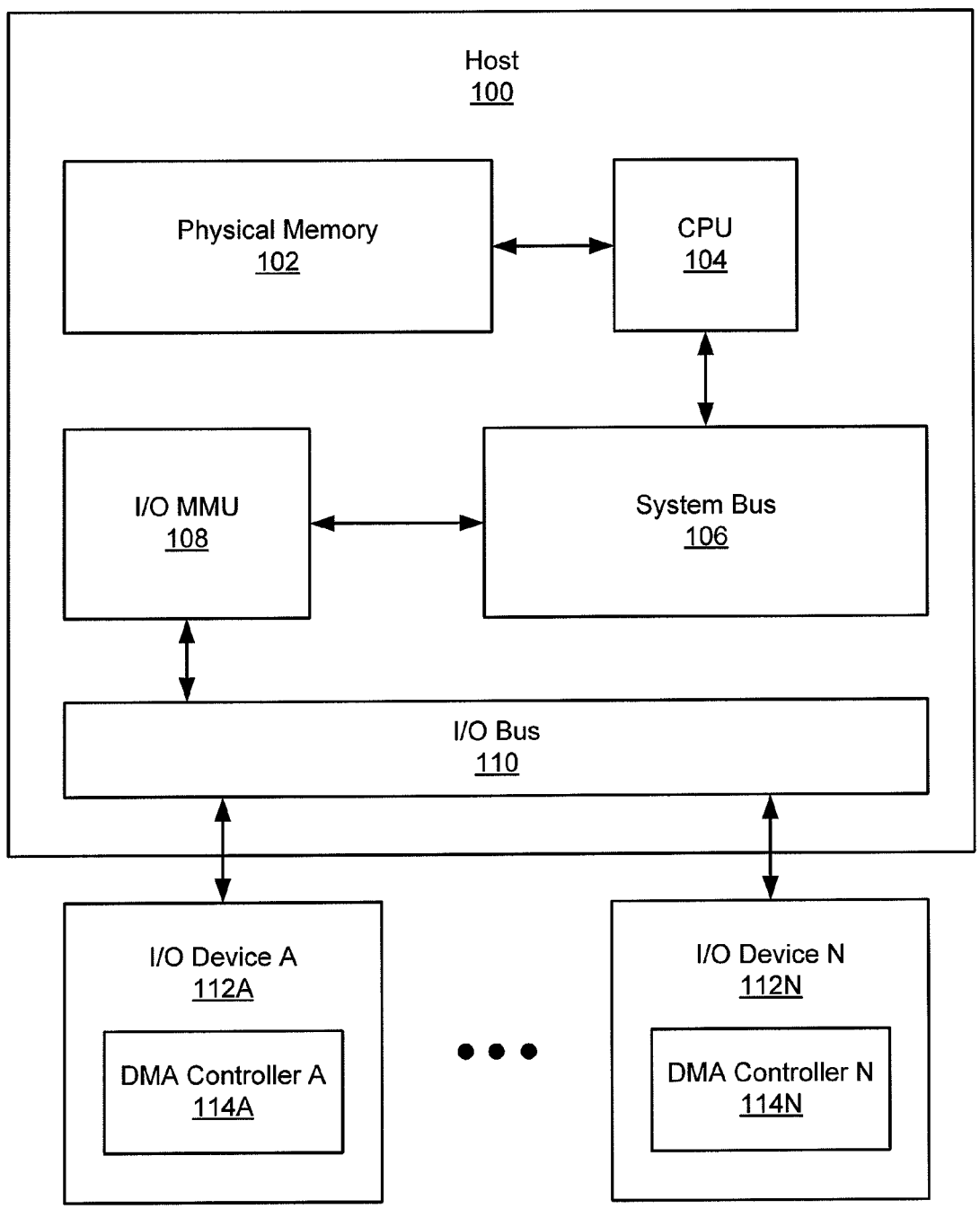
FIGS. 1A, 1B, and 1C show systems in one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details.

In other instances, well-known features have not been described in detail to avoid unnecessarily complicating the description.

In general, embodiments of the invention provide a method and an apparatus for sharing input output (I/O) memory management unit (MMU) tables between different I/O devices. One or more embodiments of the invention allow two or more processes, such as processes associated with different device drivers, to access the same translation table in the I/O MMU and the same physical memory location mapped to that translation table.

FIG. 1A shows a system in one or more embodiments of the invention. As shown in FIG. 1, the system includes a host (100), physical memory (102), central processing unit (CPU)

(104), system bus (106), I/O MMU (108), I/O bus (110), I/O device A (112A), which includes direct memory access (DMA) controller A (114A), and I/O device N (112N), which includes DMA controller N (114N). Each of these elements is discussed below.

In one or more embodiments of the invention, the physical memory (102) is any type of hardware device for storage of data. In one or more embodiments of the invention, the physical memory (102) may be used to store instructions and parameters for execution by the CPU (104). In one embodiment of the invention, the CPU (104) is a hardware processor component for processing instructions of the host (100). The CPU (104) may include multiple hardware processors. Alternatively or additionally, each hardware processor may include multiple processing cores in one or more embodiments of the invention. In general, the CPU (104) is any device configured to execute instructions on the host (100).

In one or more embodiments of the invention, the system bus (106) includes functionality to connect the CPU (104) and physical memory (102) to other components on the system. In one or more embodiments of the invention, the system bus (106) is operatively connected to at least one I/O bus (e.g., I/O bus (110)) via the I/O MMU (108). In one or more embodiments of the invention, the I/O MMU (108) is a hardware or software component that controls access to the physical memory (102).

In one embodiment of the invention, the I/O bus (110) is used by the host as a communication channel that interconnects multiple I/O peripheral communication devices, such as I/O device A (112A) and I/O device N (112N). In one embodiment of the invention, the I/O bus (110) is implemented as a Peripheral Component Interconnect (PCI) Express™ switch fabric (PCI Express™ is a trademark of the PCI-SIG).

In one embodiment of the invention, the I/O devices (I/O device A (112A), I/O device N (112N)) refer to resources connected to the I/O bus (110), which may be used by programs executing on the system for information input and/or information output. Examples of such devices may include, but are not limited to, disk drives, network interface cards, printers, etc. Further, I/O devices (I/O device A (112A), I/O device N (112N)) may also include other I/O buses (e.g., I/O bus (110), Universal Serial Bus (USB), IEEE 1394, Small Computer System Interface (SCSI), etc.). One of ordinary skill in the art will appreciate there are other I/O devices not listed here.

In one embodiment of the invention, each I/O device (I/O device A (112A), I/O device N (112N)) includes a DMA controller (DMA controller A (114A), DMA controller N (114N)). In one embodiment of the invention, a DMA controller (e.g., DMA controller A (114A), DMA controller N (114N)) is a processor dedicated to transferring data between memory locations on a system. In one embodiment of the invention, a DMA controller (DMA controller A (114A), DMA controller N (114N)) may receive instructions from a device driver (device driver A (116A), device driver N (116N)) to transfer data from a buffer on an I/O device (I/O device A (112A), I/O device N (112N)), into a location in physical memory (102). The DMA controller (DMA controller A (114A), DMA controller N (114N)) may then transfer the data as instructed, and provide a notification of completion to a device driver.

Figure 1B:
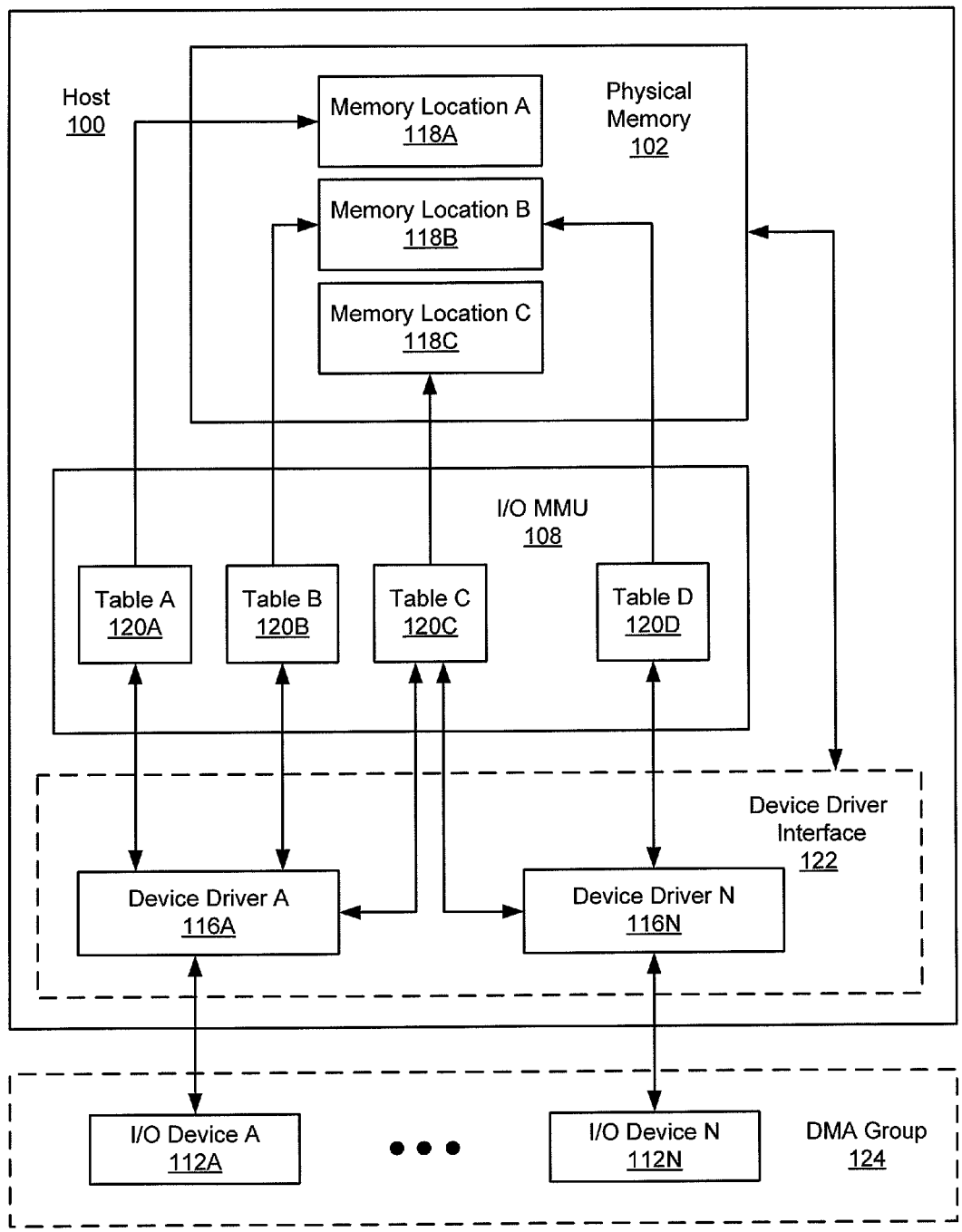

FIG. 1B shows a system in accordance with one embodiment of the invention. Specifically, FIG. 1B depicts a configuration of software and hardware components in accordance with one embodiment of the invention. As shown in FIG. 1B, the host (100) includes physical memory (102), I/O MMU (108), device drivers (device driver A (116A), device driver N (116N)), and an operating system (OS) (not shown). The host (100) communicates with the I/O devices (I/O device A (112A), I/O device N (112N)) via the device drivers (device driver A (116A), device driver N (116N)).

In one embodiment of the invention, the physical memory (102) includes multiple memory locations (e.g., memory location A (118A), memory location B (118B), and memory location C (118C)). Each memory location (e.g., memory location A (118A), memory location B (118B), and memory location C (118C)) is associated with a physical memory (PM) address indicating a particular storage cell or storage cells in the physical memory (102).

In one embodiment of the invention, the host (100) implements a paging scheme using the I/O MMU (108). Such configurations may use a combination of rapid access memory (also referred to as physical memory) and slower access memory to rotate sets of data ("pages") from slower access memory (such as a hard disk) into physical memory (such as random-access memory (RAM)). Paging schemes allow each device on the system to operate as though that device has exclusive access to a large amount of rapid access memory. The total amount of rapid access memory "perceived" by all devices on the system is significantly larger than the total amount of physical memory that actually exists on the system. The memory block "perceived" by a device is referred to as that device's virtual memory.

In one embodiment of the invention, the I/O MMU (108) includes multiple translation tables (table A (120A), table B (120B), table C (120C), and table D (120D)). Each translation table is used to convert a virtual address into a PM address. In one embodiment of the invention, each translation table is made up of entries that map virtual addresses to PM addresses. Table entries may also include an indication of whether the virtual address is part of a page currently in physical memory. Additionally, while the same virtual address for a set of data stored on the system may stay the same, the corresponding PM address for a virtual address may change.

In one embodiment of the invention, processes (such as device driver A (116A) and device driver N (116N)) store and retrieve data from virtual memory by issuing a request to the I/O MMU (108), which includes a virtual address. In response to the request, the I/O MMU (108) locates the translation table entry corresponding to the virtual address and, if necessary, loads the associated page into physical memory. The I/O MMU (108) subsequently provides the PM address to the requesting process.

In one embodiment of the invention, the device drivers (device driver A (116A), device driver N (116N)) are programs executed by processes that provide an interface between the OS and the I/O devices (I/O device A (112A), I/O device N (112N)) attached to the I/O bus (not shown). In one embodiment of the invention, the OS communicates with I/O devices (I/O device A (112A), I/O device N (112N)) by invoking a routine in the device driver (device driver A (116A), device driver N (116N)). In response, the device driver (device driver A (116A), device driver N (116N)) issues I/O messages to the I/O device. In one embodiment of the invention, the I/O messages include DMA requests to the DMA controller (DMA controller A (114A), DMA controller N (114N)) to transfer data between a physical memory location (e.g., memory location A (118A), memory location B (118B), and memory location C (118C)) and the I/O device.

In one embodiment of the invention, the OS initiates a DMA transfer between an I/O device (I/O device A (112A), I/O device N (112N), and the physical memory (102) by instructing the device driver to send a DMA request to the I/O device. The DMA request triggers a data transfer between the I/O device and a memory location (memory location A (118A), memory location B (118B), memory location C (118C)) using the I/O device's DMA controller and the device driver interface (122). In one embodiment of the invention, the memory location (memory location A (118A), memory location B (118B), memory location C (118C)) is identified by a PM address mapped to a virtual memory address in a translation table (table A (120A), table B (120B), table C (120C), table D (120D)).

In one embodiment of the invention, the device driver interface (122) provides a mechanism through which the OS and other programs on the system may interact with the device drivers (device driver A (116A), device driver N (116N)). More specifically, the device driver interface (122) enables the OS and the I/O MMU (108) to add device drivers (device driver A (116A), device driver N (116N)) to the DMA group (124). The device driver interface (122) may also enable the OS and the I/O MMU (108) to provide a shared virtual DMA address to the device drivers (device driver A (116A), device driver N (116N)) in the DMA group (124). Finally, the device driver interface (122) may also include the functionality to enable the device drivers (device driver A (116A), device driver N (116N)) to initiate DMA transfers between physical memory and the I/O devices (I/O device A (112A), I/O device N (112N)).

In one embodiment of the invention, the I/O MMU may be configured to generate multiple translation tables (table A (120A), table B (120B), table C (120C), table D (120D)) for a single device driver (device driver A (116A), device driver N (116N)). As shown in FIG. 1B, device driver A (116A) utilizes three translation tables (table A (120A), table B (120B), and table C (120C)) in the I/O MMU (108), and device driver N (116N) utilizes two translation tables (table C (120C) and table D (120D)) in the I/O MMU (108). In one embodiment of the invention, device driver A (116A) uses different translation tables for different types of data communication. For example, a device driver A (116A) may use one translation table for network communication (e.g. if I/O device A is a network interface), and a second translation table to store and access state information associated with the I/O device (I/O device A (112A), I/O device N (112N).

In one embodiment of the invention, messages are sent between the OS and the I/O device (I/O device A (112A), I/O device N (112N)), via one or more I/O device ports. In one embodiment of the invention, an I/O device port is a data path between an I/O device (I/O device A (112A), I/O device N (112N)) and a host (100). The data path may be defined by the description of the destination of the data (i.e., data sent to a port on the host or I/O device), or the data path may be defined by the hardware path taken by the data (i.e., data sent along a port between the host or I/O device), For example, all network traffic, or network traffic of a certain type, may be sent from the I/O device to the host via a single I/O device port. Further, device drivers (device driver A (116A), device driver N (116N)) may use different translation tables in the I/O MMU (108) for different I/O device ports. For example, as shown in FIG. 1B, table A (120A) may be used by device driver A (116A) for data on one I/O device port from I/O device A (112A), and table B (120B) may be used by device driver A (116A) for data on a different I/O device port from I/O device A (112A).

In one embodiment of the invention, a translation table may be generated by the I/O MMU to provide a device driver with access to data currently in physical memory (102). As shown in FIG. 1B, table B (120B) and table D (120D) are both mapped to the same location in physical memory. To access the data in memory location B (118B), device driver A (116A) may use a virtual memory address from an entry in table B (120B), while device driver N (116N) may access memory location B (118B) by using a virtual memory address from an entry in table D (120D).

In one embodiment of the invention, a DMA group (124) is a set of I/O devices (I/O device A (112A), I/O device N (112N)) that may initiate a DMA transfer using the same translation table. All I/O devices (I/O device A (112A), I/O device N (112N)) in the DMA group (124) share at least one translation table, and may read or write data to a memory location mapped by the shared translation table. In one embodiment of the invention, I/O devices (I/O device A (112A), I/O device N (112N)) may use different virtual addresses corresponding to the same entry in the shared translation table. In one embodiment of the invention, I/O devices (I/O device A (112A), I/O device N (112N)) may use different virtual addresses corresponding to different entries in the shared translation table that are mapped to the same memory location. In one embodiment of the invention, a system may include multiple DMA groups. In one embodiment of the invention, each I/O device (I/O device A (112A), I/O device N (112N)) may be part of multiple DMA groups.

In one embodiment of the invention, device driver A (116A) and device driver N (116N) may both use table C (120C) to access memory location C (118C). In one or more embodiments of the invention, each I/O device in a DMA group (124) may access the same translation table in the I/O MMU (108). As shown in FIG. 1B, both I/O device A (112A) and I/O device N (112N) may access table C (120C). In one embodiment of the invention, a shared translation table in a DMA group, such as table C (120C), is referred to as a DMA group table. Further, virtual address in a DMA group table may be referred to as shared virtual DMA addresses.

In one embodiment of the invention, DMA group data is data that is transferred from one I/O device (I/O device A (112A), I/O device N (112N)) in the DMA group (124) to the host using the DMA group table (e.g. table C (120C)). DMA group data that has been stored using the DMA group table is accessible by all other I/O devices (I/O device A (112A), I/O device N (112N)) in the DMA group (124).

In one embodiment of the invention, device drivers using the DMA group table in the I/O MMU (108) forgoes the need to create separate tables for each device driver (device driver A (116A), device driver N (116N)) to access the same memory. Further, data stored in memory by one I/O device using the DMA group table may be immediately accessed by another I/O device in the DMA group without the need to copy or map the data to a location accessible by the second I/O device. Therefore, by utilizing a DMA group table, efficiency of the overall system may be increased.

In one embodiment of the invention, I/O device drivers (device driver A (116A), device driver N (116N)) may use the same shared virtual DMA address to access a location in memory. In one embodiment of the invention, two I/O devices (I/O device A (112A), I/O device N (112N)) may use different shared virtual DMA addresses in the same DMA group table (such as table C (120C)) that access the same location in physical memory. In addition, the term I/O device (I/O device A (112A), I/O device N (112N)) may refer to an individual physical device, a function or group of functions on a multi-function device, or an I/O device port or group of I/O device ports between a host (100) and an I/O device (I/O device A (112A), I/O device N (112N)).

Figure 1C:
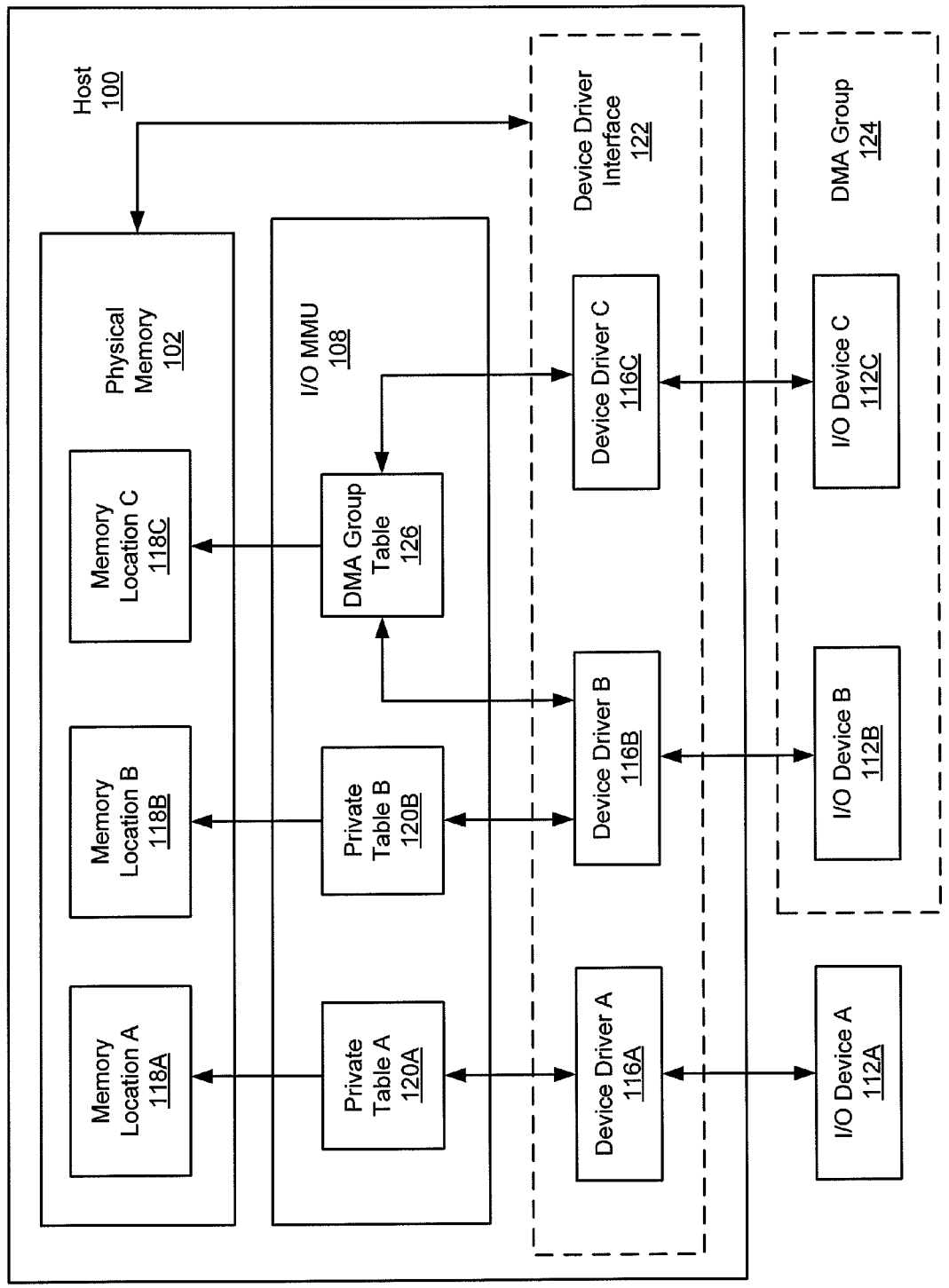

FIG. 1C shows a system in accordance with one embodiment of the invention. Specifically, FIG. 1C depicts a configuration of software and hardware components in accordance with one embodiment of the invention. As shown in FIG. 1C, the host (100) includes physical memory (102), I/O MMU (108), device driver A (116A), device driver B (116B), and device driver C (116C). physical memory (102) includes memory location A (118A), memory location B (118B), and memory location C (118C). The I/O MMU (108) includes private table A (120A), private table B (120B), and DMA group table (126). The host (100) is operatively connected to I/O device A (112A), I/O device B (112B)), and I/O device C (112C). I/O device B (112B) and I/O device C (112C) are part of a DMA group (124). Data is transferred from the I/O devices (I/O device A (112A), I/O device B (112B), I/O device C (112C)) to the physical memory (102) by the DMA controllers (not shown) on each I/O device via the device driver interface (122).

In one embodiment of the invention, the OS (not shown) may configure device driver A (116A) such that data received by I/O device A (112A) is immediately transmitted using I/O device B (112B). In such a configuration, device driver A (116A) may first be notified of incoming data on I/O device A (112A). Device driver A (116A) may then initiate a DMA transfer from I/O device A (112A) to the physical memory (102) using a virtual memory address in private table A (120A). The data may then be transferred from I/O device A (112A) to memory location A (118A) via the device driver interface (122). Once the OS is notified of the incoming data, that data may then be copied into memory location B (118B), which is accessible by device driver B (116B). Device driver B (116B) then may use virtual address in private table B to initiate the transfer of the data from memory location B (118B) to I/O device B (112B).

In one embodiment of the invention, the OS (not shown) may configure device driver B (116B) such that data received by I/O device B (112B) is immediately transmitted using I/O device C (112C). In such a configuration, the OS may create the DMA group (124), and add I/O device B (112B) and I/O device C (112C) to the DMA group (124). Once the DMA group (124) is created, device driver B (116B) may be notified of incoming data on I/O device B (112B). Device driver B (116B) may then initiate a DMA transfer from I/O device B (112B) to the physical memory (102) using a shared virtual DMA address in DMA group table (126). The data may then be transferred from I/O device B (112B) to memory location C (118C) via the device driver interface (122). Device driver C (116C) then be notified of data in memory location C (118C). Device driver C (116C) may use the shared DMA virtual address in the DMA group table to initiate the transfer of the data from memory location C (118C) to I/O device C (112C).

Figure 2:
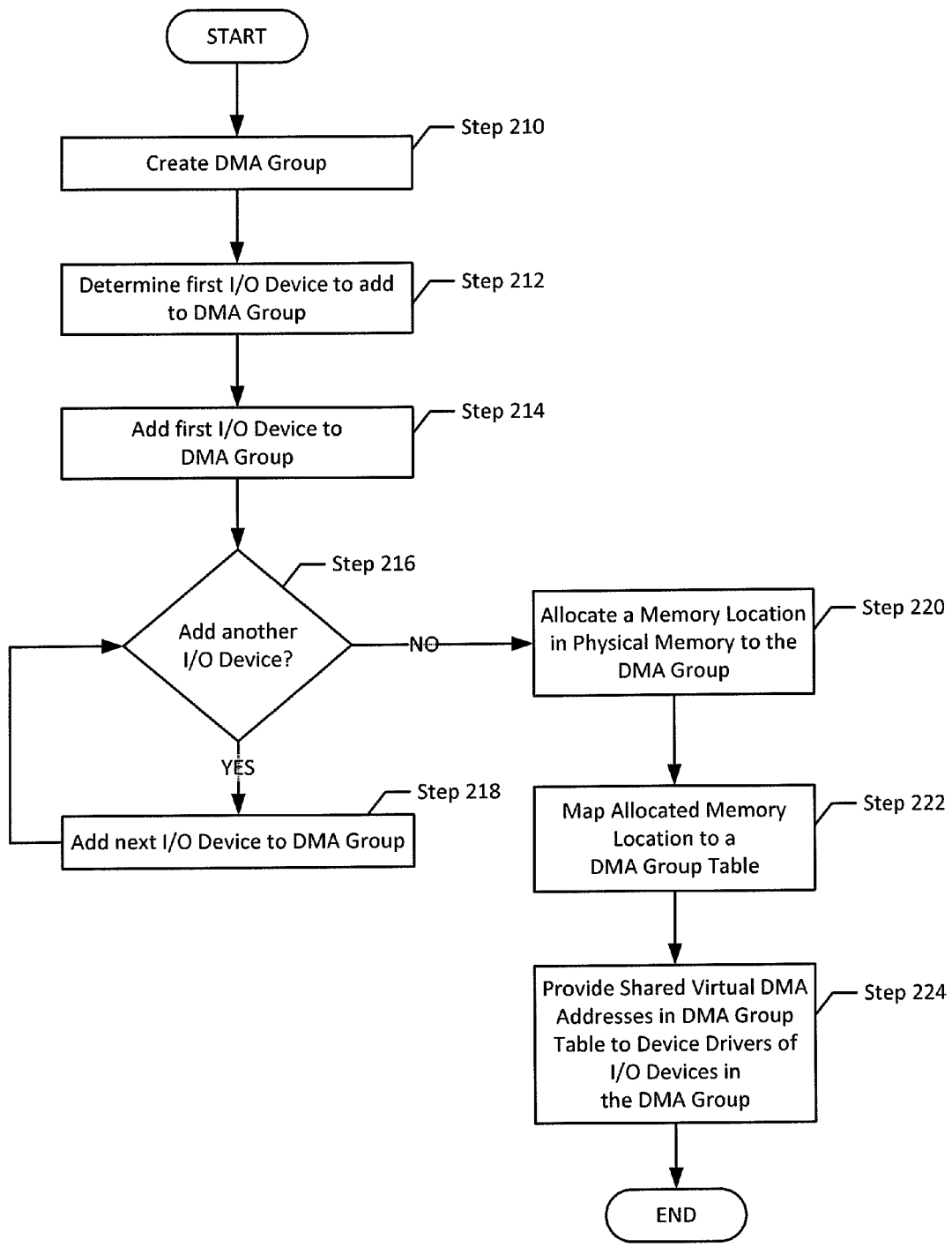
FIGS. 2-4 show flowcharts in one or more embodiments of the invention.

FIG. 2 shows a flowchart for creating a DMA Group in accordance with one or more embodiments of the invention. While the various steps in the flowchart are presented and described sequentially, some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, additional steps, omitted in FIG. 2, may be included in performing this method. Accordingly, the specific arrangement of steps shown in FIG. 2 should not be construed as limiting the scope of the invention.

At Step 210, the OS creates a DMA group. At Step 212, the OS determines which I/O device to add to the DMA group. In one embodiment of the invention, two devices may be added to a DMA group and configured such that data received on the first I/O device may be transmitted from the system using the second I/O device. For example, a first network interface device may send and receive traffic from a secured network, and a second network interface device may send and receive traffic from an unsecured network. The OS may create a DMA group and configure the network interface devices such that all traffic received by the first network interface device is transmitted out using the second network interface device.

As another example, an input video device may receive video data from a video source, a first output video device may send video data to a display device, and a second output video device may record video data on a storage media. An OS may create a DMA group and add the video input device and the two video output devices to the DMA group. The OS may configure the DMA group such that data received by the video input device is transmitted out using the two video output devices.

In Step 214, the OS adds the first I/O device to the DMA group. In Step 216, the OS determines whether to add another I/O device. In one embodiment of the invention, I/O devices may be added and removed dynamically at any time to a DMA group. Therefore, a DMA group may be created initially with only a single I/O device. If in Step 216, the OS determines that another I/O device is to be added to the DMA group, then in Step 218, the next I/O device is added to the group. Once the OS determines that no other I/O devices are to be added to the DMA group at this time, then in Step 220, the OS allocates a memory location in physical memory to the DMA group. In Step 222, the allocated memory location is mapped to a DMA group table in the I/O MMU. In Step 224, the OS provides the shared virtual DMA address in the DMA group table to all device drivers associated with the I/O devices in the DMA group.

Figure 3:
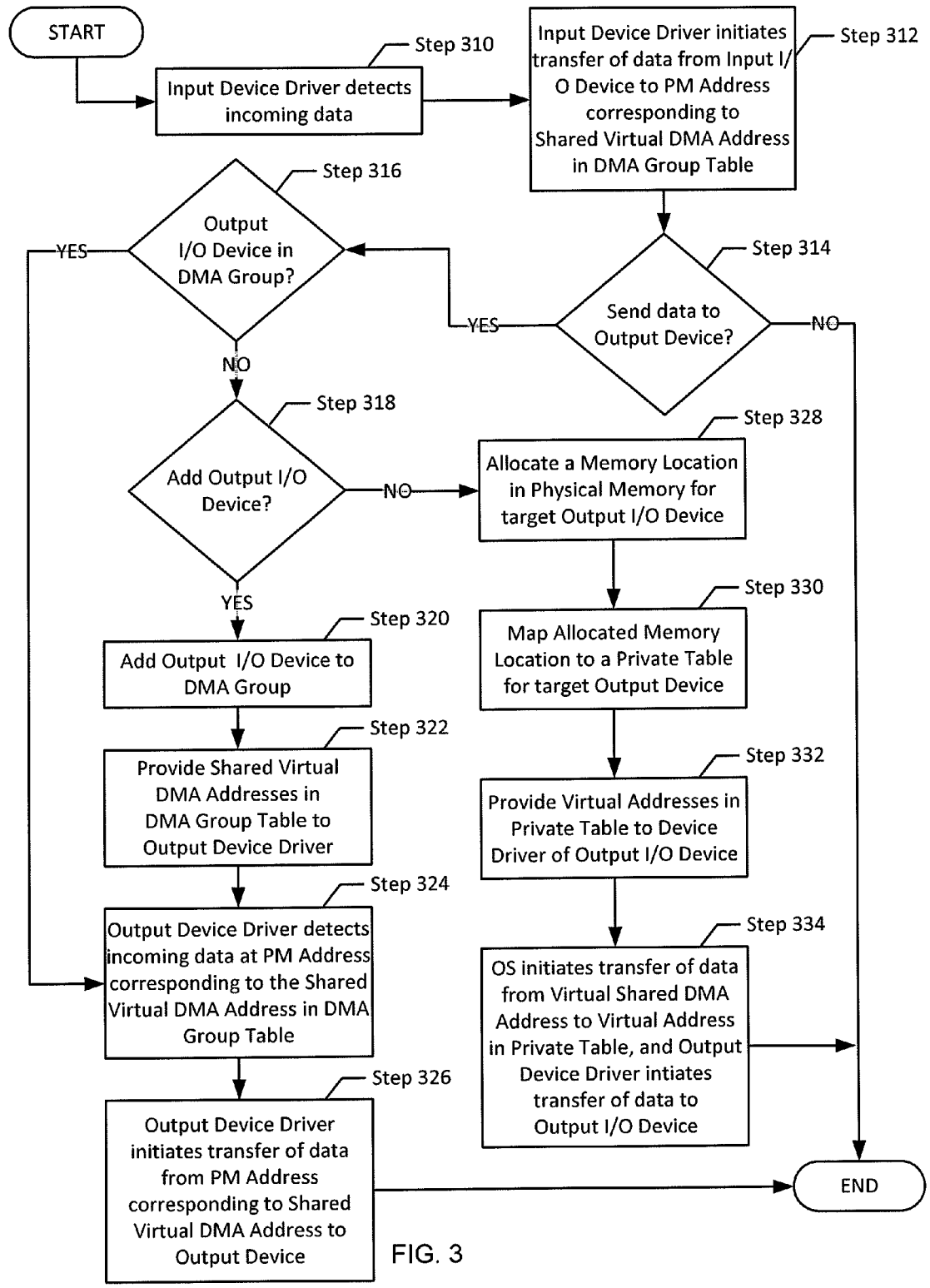

FIG. 3 shows a flowchart for transferring data between two I/O devices within a DMA group. While the various steps in the flowchart are presented and described sequentially, some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, additional steps, omitted in FIG. 3, may be included in performing this method. Accordingly, the specific arrangement of steps shown in FIG. 3 should not be construed as limiting the scope of the invention.

In Step 310, the input device driver detects incoming data. In one embodiment of the invention, an I/O device receiving data into the DMA group is referred to as an input I/O device, and the device driver associated with an input I/O device is referred to as an input device driver. Similarly, in one embodiment of the invention, an I/O device in the DMA group that is transferring data out of the system is referred to as an output I/O device, and the device driver associated with an output I/O device is referred to as an output device driver.

In Step 312, the input device driver initiates the transfer of data from the input I/O device to the PM address corresponding to the shared virtual DMA address in the DMA group table. In Step 314, the OS determines whether the incoming data is to be sent to an output I/O device. In one embodiment of the invention, the OS may be configured to send all incoming data received at an address in the DMA group table to one or more I/O devices in the DMA group. In one embodiment of the invention, the OS may be configured to send all incoming data received at an address in the DMA group table to all I/O devices in the DMA group. In one embodiment of the invention, the OS may be configured to perform some analysis on the data to determine whether to send the data to an I/O device, and to which device the data should be sent. For example, an I/O device may be configured to receive email data from a wide area network and transfer the email data into the physical memory using the DMA group table. The OS may be configured to inspect the data as it arrives in the memory location for indications of viruses. Email data that appears to be free of viruses may then be transferred to a second I/O device attached to an internal network. Email data that appears to carry a virus may be discarded.

If the OS determines that the data should be sent to an I/O device, then in Step 316, the OS determines whether there is a suitable output I/O device currently in the DMA group. If there is no suitable output I/O device in the DMA group, then, in Step 318, the OS determines whether an I/O device should be added to the DMA group for use as an output I/O device. If the OS determines that an output I/O device should be added, then in Step 320, the OS adds an I/O device to the DMA Group. In Step 322, the OS provides the output device driver with the shared virtual DMA address for the data.

If there is an existing output I/O device in the DMA group, or if one has been properly added, then in Step 324, the output device driver is notified of the data at the PM address corresponding to the shared virtual DMA address in the DMA group table. In Step 326, the output device driver initiates the transfer of the data from the shared virtual DMA address location to the output I/O device. In one embodiment of the invention, the output device driver instructs the DMA controller for the output I/O device to transfer the data from the PM address corresponding to the shared virtual DMA address to the output I/O device.

If in Step 318, the OS determines that an output I/O device should not be added to the DMA group, but the data should still be sent to an output I/O device, then in Step 328, the OS allocates a memory location in physical memory for use by the target output I/O device. In Step 330, the allocated memory location is mapped to a private translation table for use by the device driver of the output I/O device. In Step 332, the virtual addresses in the private translation table are provided to the device driver of the output I/O device. In Step 334, the OS initiates a transfer of the data from the shared virtual DMA address to the virtual address used by the output device driver, and the output device driver initiates a DMA transfer of the data from the virtual address to the output I/O device.

Figure 4:
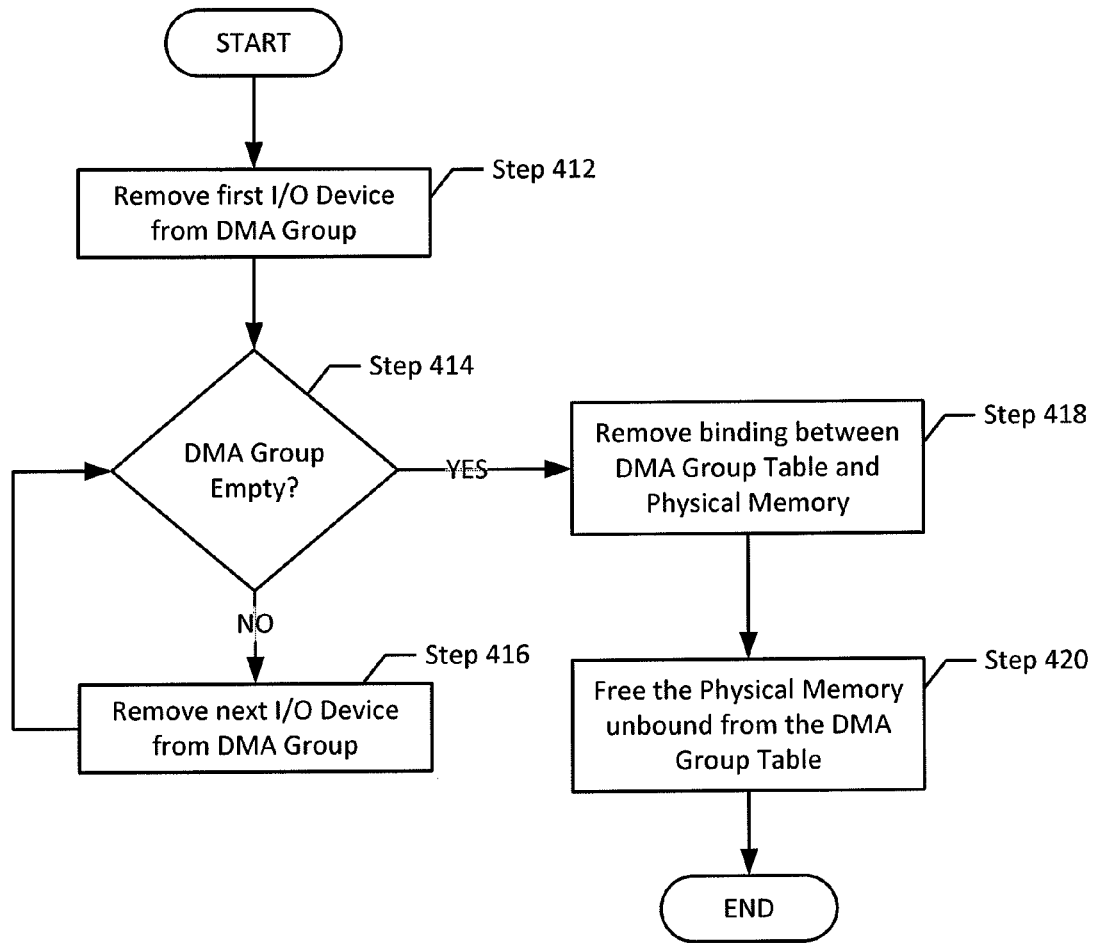

FIG. 4 shows a flowchart for terminating the DMA group. While the various steps in the flowchart are presented and described sequentially, some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, additional steps, omitted in FIG. 4, may be included in performing this method. Accordingly, the specific arrangement of steps shown in FIG. 4 should not be construed as limiting the scope of the invention.

In Step 412, the OS removes an I/O device from the DMA group. in Step 414, the OS determines whether the DMA group still includes any I/O devices. If the OS determines that the DMA group includes at least one I/O device, then in Step 416, the OS removes the next I/O device in the DMA group. If, in Step 414, the OS determines that the DMA group no longer includes any I/O devices, then in Step 418, the OS instructs the I/O MMU to remove the bindings between the DMA group table and the physical memory. In Step 420, the OS frees the physical memory that has been unbound from the DMA group table.

Figure 5A:
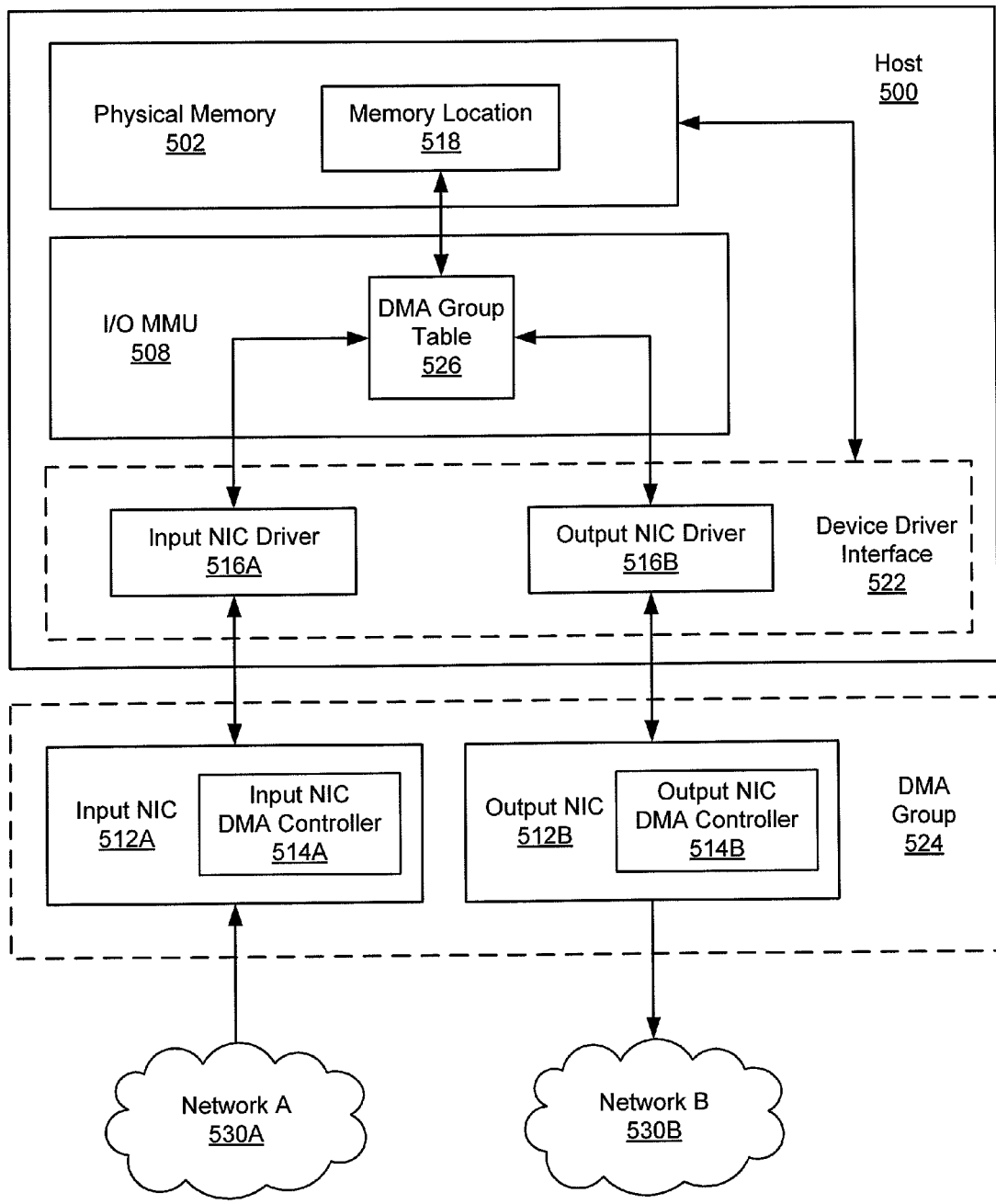
FIGS. 5A and 5B show an example in one or more embodiments of the invention.
Figure 5B:
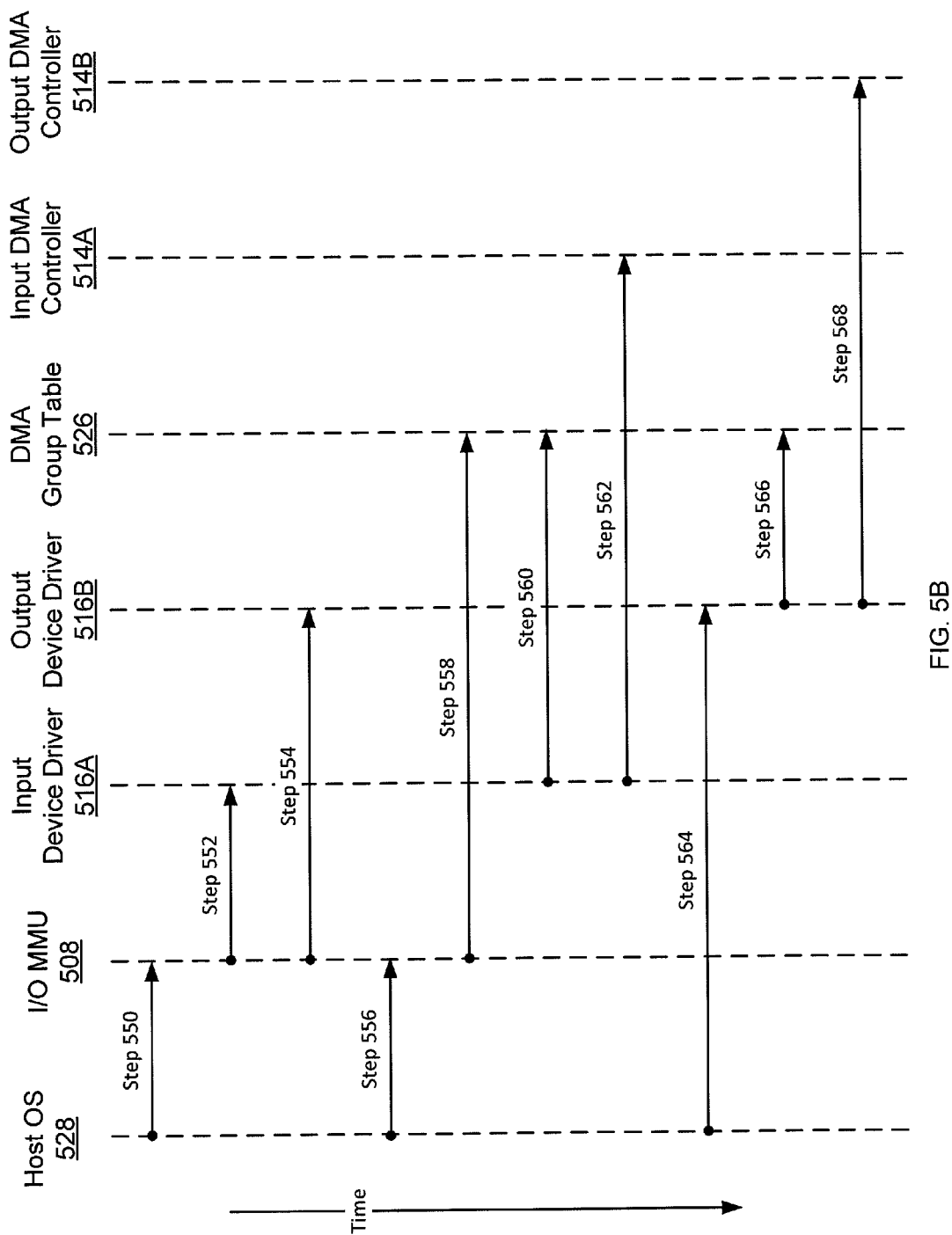

FIGS. 5A and 5B show an exemplary system and timeline in accordance with one embodiment of the invention. Specifically, FIGS. 5A and 5B depict an embodiment of the invention in which a DMA group is created and data is received by one I/O device and transmitted by a second I/O device.

As shown in FIG. 5A, the system includes host (500) connected to an input I/O device (512A) and an output I/O device (512B). The host (500) includes a physical memory (502) with a memory location (518). The host (500) further includes an I/O MMU (508) that includes a DMA group table (526). Finally, the host (500) includes an input device driver (516A) and an output device driver (516B). The input I/O device (512A) is connected to network A (530A) and includes an input DMA controller (514A). The output I/O device (512B) is connected to network B (530B) and includes an output DMA controller (514B). The input I/O device (512A) and the output I/O device (512B) are part of a DMA group (524). Data may be transferred from the I/O devices into the physical memory via the device driver interface (522).

FIG. 5B shows a timeline of an exemplary interaction between the elements in FIG. 5A. Specifically, FIG. 5B shows a timeline for creating a DMA group and receiving and transmitting data from one I/O device in the DMA group to another. In Step 550, the host OS (528) creates the DMA group (524) and instructs the I/O MMU (508) to add the input I/O device (512A) and the output I/O device (512B) to the DMA group (524). In Step 552, the I/O MMU (508) adds the input I/O device (512A) to the DMA group (524). In Step 554, the I/O MMU (508) adds the output I/O device (512B) to the DMA group (524).

In Step 556, the host OS (528) allocates a memory location (518) in physical memory (502) for use by the DMA group, and instructs the I/O MMU (508) to create a DMA group table to map shared virtual DMA address from the DMA group table to the allocated location in physical memory (502). In Step 558, the I/O MMU (508) creates the DMA group table (526), and provides the shared virtual DMA address to the input I/O device (512A) and the output I/O device (512B)

In Step 560, the input device driver (516A) is notified of incoming data on the input I/O device (512A), and initiates the DMA transfer of data from the input I/O device (512A) to the host (500) using the shared virtual DMA address. Specifically, the input device driver (516A) uses the shared virtual DMA address to obtain the PM address of the memory location in physical memory (502) from the DMA group table (526). In Step 562, the input device driver (516A) instructs the input DMA controller (514A) on the input I/O device (512A) to transfer the incoming data to the memory location (518) obtained from the DMA group table (526).

In Step 664, the host OS (528) instructs the output device driver (516B) to transfer the data from the shared virtual DMA address to the output I/O device (512B). In Step 566, the output device driver (516B) uses the shared virtual DMA address to obtain the PM address of the memory location in physical memory (502) from the DMA group table (526). In Step 568, the output device driver (516B) instructs the output DMA controller (514B) on the output I/O device (512B) to transmit the data from the memory location (518) obtained from the DMA group table (526).

Figure 6:
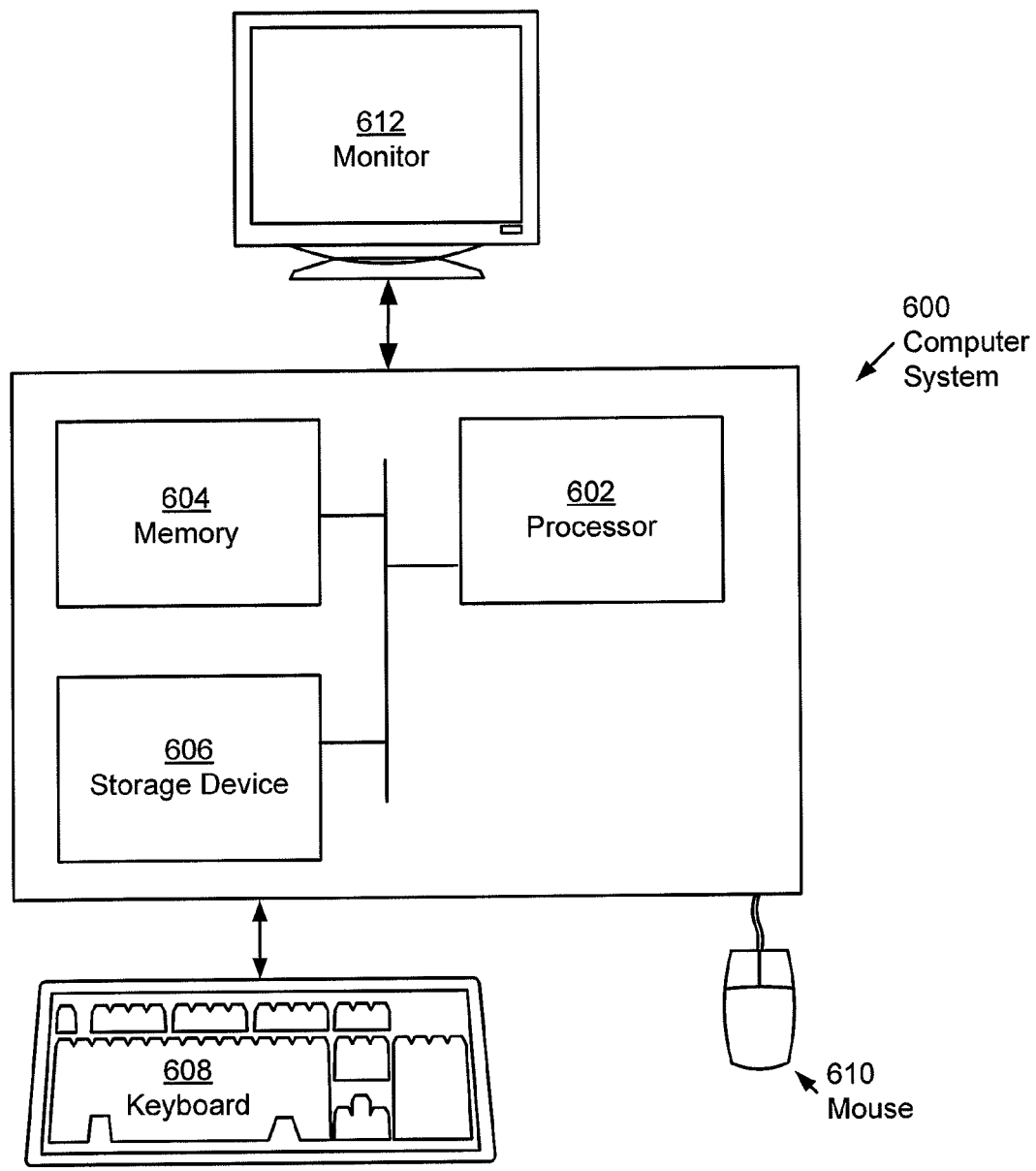
FIG. 6 shows a system in one or more embodiments of the invention.

Embodiments of the invention may be implemented on virtually any type of computer regardless of the platform being used. For example, as shown in FIG. 6, a computer system (600) includes one or more processor(s) (602), associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer (600) may also include input means, such as a keyboard (608), a mouse (610), or a microphone (not shown). Further, the computer (600) may include output means, such as a monitor (612) (e.g., a liquid crystal display (LCD), a plasma display, or cathode ray tube (CRT) monitor). The computer system (600) may be connected to a network (not shown) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions, which when executed by a processor perform a method, the method comprising:
    creating a direct memory access (DMA) group;
    adding a first input/output (I/O) device to the DMA group, wherein the first I/O device is associated with a first device driver executing on a host;
    adding a second I/O device to the DMA group, wherein the second I/O device is associated with a second device driver executing on the host;
    instructing an I/O memory management unit (MMU) to create a DMA group translation table comprising a shared virtual DMA address and a private translation table comprising a virtual address for use by a third I/O device;
    mapping a memory location within a physical memory to the shared virtual DMA address in the DMA group translation table;
    providing the shared virtual DMA address to the first device driver and the second device driver;
    determining that the first I/O device has received DMA group data;
    instructing, by the first device driver, a first DMA controller on the first I/O device to transfer the DMA group data from the first I/O device to the memory location corresponding to the shared virtual DMA address;
    determining that the DMA group data is to be sent to an output I/O device and that the second I/O device is the output I/O device;
    detecting, by the second device driver, that the memory location corresponding to the shared virtual DMA address has received the DMA group data;
    instructing, by the second device driver, a second DMA controller on the second I/O device to transfer the DMA group data from the memory location corresponding to the shared virtual DMA address to the second I/O device;
    mapping a second memory location within the physical memory to the virtual address in the private translation table;
    providing the virtual address to a third device driver executing on the host and associated with the third I/O device, wherein the DMA group excludes the third I/O device;
    copying the DMA group data from the shared virtual DMA address to the virtual address; and
    instructing, by the third device driver, a third DMA controller on the third I/O device to transfer the DMA group data from the virtual address to the third I/O device.

2. The non-transitory computer readable medium of claim 1, the instructions further comprising:
    adding a fourth I/O device to the DMA group, wherein the fourth I/O device is associated with a fourth device driver executing on the host; and
    instructing, by the fourth device driver, a fourth DMA controller to transfer the DMA group data from the memory location corresponding to the shared virtual DMA address to the fourth I/O device.

3. The non-transitory computer readable medium of claim 1, wherein the I/O MMU comprises a private table accessible by the first device driver.

4. The non-transitory computer readable medium of claim 1,
    wherein the DMA group data is written to the memory location in the physical memory by the first DMA controller, and
    wherein the DMA group data is read from the memory location in the physical memory by the second DMA controller.

5. The non-transitory computer readable medium of claim 1, wherein the DMA group table comprises an entry comprising the shared virtual DMA address and the memory location in physical memory.

6. The non-transitory computer readable medium of claim 1,
    wherein the first I/O device is a first network interface device connected to a first network, and
    wherein the second I/O device is a second network interface device connected to a second network.

7. A system comprising:
    a first input/output (I/O) device comprising a first DMA controller;
    a second I/O device comprising a second DMA controller;
    a third I/O device comprising a third DMA controller;
    a physical memory comprising a memory location and a second memory location;
    an I/O memory management unit (MMU) comprising a direct memory access (DMA) group translation table and a private translation table;
    a host operating system (OS) configured to:
        create a DMA group;
        add the first I/O device and the second I/O device to the DMA group;

instruct the I/O MMU to create a shared virtual DMA address in the DMA group translation table;
map the memory location to the shared virtual DMA address in the DMA group translation table;
provide the shared virtual DMA address to a first device driver and a second device driver;
instruct the I/O MMU to create a virtual address in the private translation table, wherein the virtual address is used by a third I/O device;
map the second memory location to the virtual address in the private translation table;
provide the virtual address to a third device driver; and
copy DMA group data from the shared virtual DMA address to the virtual address,
wherein the first device driver is configured to:
determine that the first I/O device has received the DMA group data; and
instruct the first DMA controller to transfer the DMA group data from the first I/O device to the memory location corresponding to the shared virtual DMA address,
wherein the second device driver is configured to:
determine that the DMA group data is to be sent to an output I/O device and that the second I/O device is the output I/O device;
detect that the memory location corresponding to the shared virtual DMA address has received the DMA group data; and
instruct the second DMA controller to transfer the DMA group data from the memory location corresponding to the shared virtual DMA address to the second I/O device,
wherein the third device driver is configured to:
instruct the third DMA controller to transfer the DMA group data from the virtual address to the third I/O device, and
wherein the DMA group excludes the third I/O device.

8. The system of claim 7, further comprising
a fourth I/O device,
wherein the host OS is further configured to:
add the fourth I/O device to the DMA group; and
a fourth device driver configured to
instruct a fourth DMA controller to transfer the DMA group data from the memory location corresponding to the shared virtual DMA address to the fourth I/O device.

9. The system of claim 7, wherein the I/O MMU comprises a private table accessible by the first device driver.

10. The system of claim 7,
wherein the DMA group data is written to the memory location in the physical memory by the first DMA controller, and
wherein the DMA group data is read from the memory location in the physical memory by the second DMA controller.

11. The system of claim 7, wherein the DMA group table comprises an entry comprising the shared virtual DMA address and the memory location in physical memory.

12. The system of claim 7,
wherein the first I/O device is a first network interface device connected to a first network, and
wherein the second I/O device is a second network interface device connected to a second network.

13. A method for sharing an input/output (I/O) memory management unit translation table comprising:
creating a direct memory access (DMA) group;
adding a first input/output (I/O) device port to the DMA group, wherein the first I/O device port is associated with a first I/O device and a first device driver executing on a host;
adding a second I/O device port to the DMA group, wherein the second I/O device port is associated with a second I/O device and a second device driver executing on the host;
instructing an I/O memory management unit (MMU) to create a DMA group translation table comprising a shared virtual DMA address and a private translation table comprising a virtual address for use by a third I/O device;
mapping a memory location within a physical memory to the shared virtual DMA address in the DMA group translation table;
providing the shared virtual DMA address to the first device driver and the second device driver;
determining that the first I/O device port has received DMA group data;
instructing, by the first device driver, a first DMA controller on the first I/O device to transfer the DMA group data from the first I/O device port to the memory location corresponding to the shared virtual DMA address;
determining that the DMA group data is to be sent to an output I/O device and that the second I/O device is the output I/O device;
detecting, by the second device driver, that the memory location corresponding to the shared virtual DMA address has received the DMA group data;
instructing, by the second device driver, a second DMA controller on the second I/O device to transfer the DMA group data from the memory location corresponding to the shared virtual DMA address to the second I/O device port;
mapping a second memory location within the physical memory to the virtual address in the private translation table;
providing the virtual address to a third device driver executing on the host and associated with the third I/O device port, wherein the DMA group excludes the third I/O device port;
copying the DMA group data from the shared virtual DMA address to the virtual address; and
instructing, by the third device driver, a third DMA controller on the third I/O device port to transfer the DMA group data from the virtual address to the third I/O device port.

14. The method of claim 13, further comprising:
adding a fourth I/O device port to the DMA group, wherein the fourth I/O device port is associated with a third device driver executing on the host; and
instructing, by the fourth device driver, a fourth DMA controller to transfer the DMA group data from the memory location corresponding to the shared virtual DMA address to the fourth I/O device port.

* * * * *

UNITED STATES PATENT AND TRADEMARK OFFICE
CERTIFICATE OF CORRECTION

| | | |
|---|---|---|
| PATENT NO. | : 9,003,077 B2 | Page 1 of 1 |
| APPLICATION NO. | : 13/249495 | |
| DATED | : April 7, 2015 | |
| INVENTOR(S) | : Ye et al. | |

It is certified that error appears in the above-identified patent and that said Letters Patent is hereby corrected as shown below:

On the title page, in the illustrative figure, under Reference Step 334, line 5, delete "intiates" and insert -- initiates --.

In drawings, sheet 5 of 9, in FIG. 3, under Step 334, line 5, delete "intiates" and insert -- initiates --, therefor.

In column 10, line 39, delete "(512B)" and insert -- (512B). --, therefor.

Signed and Sealed this
Tenth Day of November, 2015

Michelle K. Lee
*Director of the United States Patent and Trademark Office*